Sept. 14, 1965   M. A. SPRAGUE   3,205,898
METHOD AND APPARATUS FOR STORING PLANT MATERIALS
Filed Nov. 28, 1960   4 Sheets-Sheet 1

INVENTOR.
Milton A. Sprague
BY
Robert S. Dunham
Attorney

Sept. 14, 1965     M. A. SPRAGUE     3,205,898
METHOD AND APPARATUS FOR STORING PLANT MATERIALS
Filed Nov. 28, 1960     4 Sheets-Sheet 2

INVENTOR.
Milton A. Sprague
BY
Robert S. Dunham
Attorney

Sept. 14, 1965  M. A. SPRAGUE  3,205,898
METHOD AND APPARATUS FOR STORING PLANT MATERIALS
Filed Nov. 28, 1960  4 Sheets-Sheet 3

INVENTOR.
Milton A. Sprague
BY
Robert S. Dunham
Attorney

INVENTOR.
Milton A. Sprague
BY Robert S. Dunham
Attorney

United States Patent Office 3,205,898
Patented Sept. 14, 1965

3,205,898
METHOD AND APPARATUS FOR STORING PLANT MATERIALS
Milton A. Sprague, Dayton, N.J., assignor to Rutgers Research and Educational Foundation, New Brunswick, N.J., a non-profit corporation of New Jersey
Filed Nov. 28, 1960, Ser. No. 72,218
7 Claims. (Cl. 130—20)

This invention relates to the storing of plant materials, particularly chopped, fibrous plant materials of grass or leguminous species, or species of like nature, which are to be preserved as silage. More particularly, the invention relates to methods and apparatus for the above purpose, especially in stacking and enclosing such products so that the preservative and other actions of fermentation can occur with minimal spoilage and loss of nutrient values and so that the stored silage can be satisfactorily used as feed for farm stock, e.g. in conventional ways.

In the preservation of plant materials, particularly so-called forages, as silage, it has been conventional to use permanent structures or receptacles, such as the familiar tower silo, or in some localities, bunkers, pits or the like. Since a basic principle of ensiling plant material is that fermentation occurs to the point of a suitably low pH while maintaining an absence of air, whereby undesirable aerobic or putrefactic bacteria are inhibited or killed, it is particularly important to exclude air from the mass of material. Even in conventional tower silos, there is often spoilage of an uppermost layer because of access of air, while losses due to seepage, evaporation, plant respiration and other factors may also be considerable, i.e. especially in the nature of loss of nutrient values.

It has been proposed to utilize some sealing means at the top of the material in tower silos, and I have also employed arrangements of free-standing, step-wise stacks enclosed in plastic covers, all with the view of better enclosure for the material. These arrangements, however, have been inconvenient or difficult to use, or have failed to provide conveniently and economically for large masses of stored silage. It will be appreciated, for example, that special and cumbersome operations for stacking and retaining materials of this sort, represent a source of inefficiency in farm work, especially if the results can only be obtained with relatively small stacks or masses of material.

Accordingly, important objects of the present invention are to afford methods and apparatus whereby plant materials can be stacked and preserved as silage, in a simple and convenient manner and with effective results in minimizing spoilage and losses. A particular object is the provision of efficient mechanical structure, of a demountable type, which can be employed for rapid stacking of forage, without extraordinary requirements of labor or of mechanical aid. A further object is the provision of improved procedure whereby a thoroughly satisfactory, enclosed and indeed sealed stack of such material may be established, for holding and preserving silage without excessive losses over desirably long periods of time.

Another object is the provision of means and methods as described herein, such that stacks of silage can be built and maintained in any of a variety of sizes, including considerable amounts, with corresponding efficiency in farm operation. Indeed a special advantage of the invention is its versatility, for instance as to kind and amount of material stored, or in that it requires no permanent structure and can be used at almost any place on the farm.

To these and other ends, certain examples of the improved structures of the invention, and likewise illustrations of the mode of performing the procedure, are set forth in the accompanying drawings, wherein.

Basically, referring to FIGS. 1 to 5 inclusive, a preferred form of the invention involves the provision of a multiplicity of panels 20 arranged to be connected at their vertical edges so that they can be erected as an upright cylindrical form 21, conveniently resting on the ground. Each panel may be made of rigid sheet material (metallic or non-metallic), iron or steel sheet being generally satisfactory, for example 20 gauge galvanized iron sheet, so as to have sufficient strength for the desired purpose but yet easily handled by one man.

Figure 1:
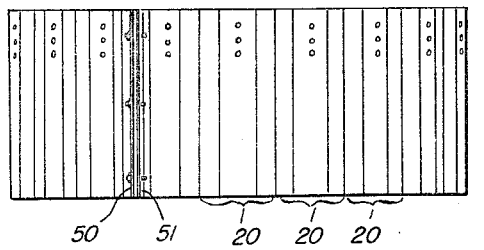
FIG. 1 is a somewhat simplified view in elevation of the stacking means as originally erected at the beginning of the stacking operation.
Figure 2:
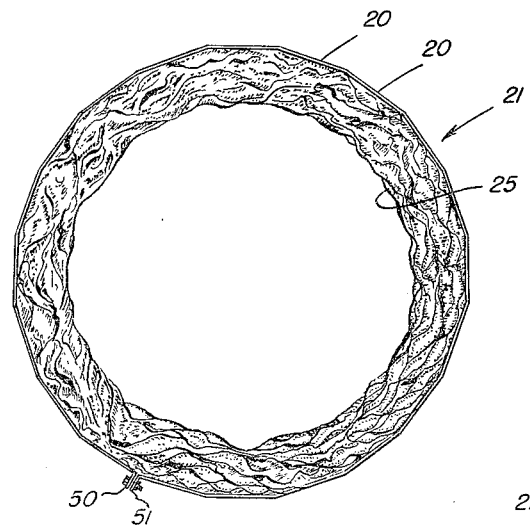
FIG. 2 is a plan view of the structure of FIG. 1.
Figure 3:
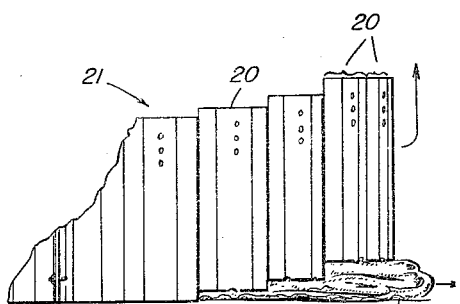
FIG. 3 is a fragmentary view similar to FIG. 1, illustrating a positional adjustment of the plastic enclosure before stacking.

In particular, each panel 20 (except as noted hereinbelow) has a folded lip or hook-like flange 22 or 23 along each vertical edge (see FIGS. 8 to 11), so as to interlock in sliding relation with the corresponding lip or flange of the adjacent panel. Thus to establish the form for building the stack of plant material, the panels are assembled in the described relation, either by sidewise hooking them or vertically sliding them into connection with each other at their vertical edges. The cylindrical assembly of FIG. 1 is thus erected at a desired place, e.g. on firm level ground out of doors, with a sufficient number of panels to provide a cylinder of adequate diameter for the selected size of stack, for example a horizontal diameter of 10 feet or more, and very preferably 20 feet or even larger.

The invention also contemplates that the finished stack shall be enclosed in a fabric material, particularly a plastic film or pliable sheet which will cover and in effect seal the entire sides and top of the finished stack. Conveniently the plastic enclosure is provided as a large tubular piece of thin plastic sheet, i.e. adapted to constitute a cylinder of diameter equal to that of the stack under construction, and a length such that it can be well tucked under the stack at the bottom end and can be gathered together across the top of the stack so as to enclose the latter on completion. For example, to accommodate a 20 foot diameter stack having a height of 15 feet, the thin plastic tube can have the dimensions of a cylinder 20 feet in diameter and 28 feet or more in altitude.

Before, during or after the initial erection of the assembly 21, the tubular plastic cover 25 is placed in gathered and collapsed form inside the panels 20, i.e.

so that it lies on the ground as a toroidal bundle. Conveniently the panels may be assembled around it, i.e. so that it is not injured by the lower edges of the metal members. Thereafter, the panels may be temporarily elevated in succession, e.g. by upwardly sliding groups of two or more of them a short distance, and the plastic sheet material is manually pulled to a position outside the assembly, i.e. as shown at 25a in FIG. 3. In so doing, one end region of the plastic tube is left beneath the bottom edges of the panels, such that a portion of the plastic, say a foot or two, remains within the cylindrical metal structure to provide the part of the cover that will in effect be tucked under the stack of silage. The main body of the plastic material thus rests outside the metal assembly, and in position to be pulled up when the stack is finished.

As will now be understood, the desired plant or vegetable material, such as alfalfa, timothy, various grasses or other forage crops appropriately chopped or cut as conventional for silage and being in fresh, moist, green condition, is now supplied to the interior of the form 21 and packed tightly and uniformly. The supply of green material to the stacking form can be effected with an appropriate loader or blower of conventional design, e.g. as indicated at 27, FIG. 4. The actual stacking and compacting of the material is effected by one or more men working in the form, it being found that adequately tight packing is achieved by tramping down the bed of forage as it is piled up. So packed, these chopped, fibrous plant materials bind themselves together into a stable mass, and in consequence the stack retains its shape and supports itself quite adequately when the form is removed.

Figure 4:
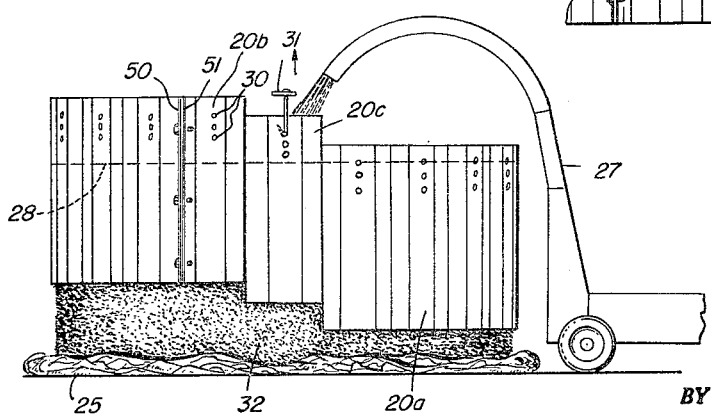
FIG. 4 is a view similar to FIG. 1, showing the assembly during the stacking operation, including the upward re-positioning of the elements.
Figure 5:
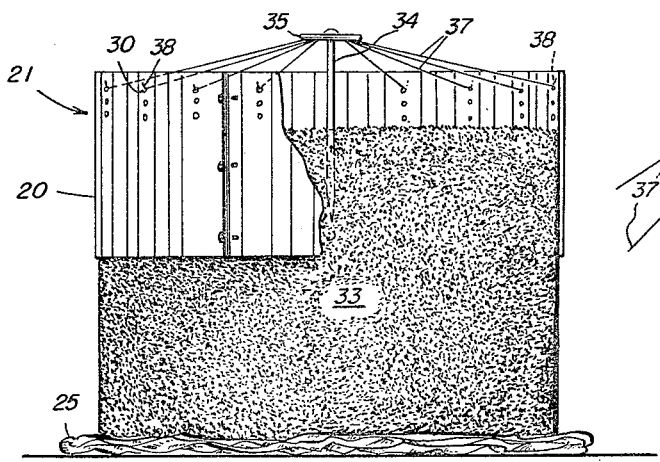
FIG. 5 is an elevational view, with parts broken away, of the structure on completion of stacking, with certain additional instrumentalities.
Figure 6:
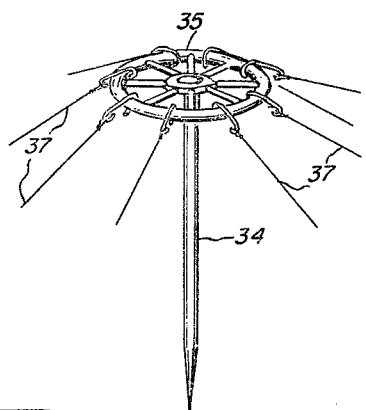
FIG. 6 is a perspective view of the panel-retaining device of FIG. 5.

As the stack rises within the form, the latter is progressively elevated to accommodate further quantities of material and thus attain a completed stack of any desired height, for example, of 10 to 20 feet. A particular feature of the invention is that the elevation of the form is easily effected by sliding the individual panels upward, i.e. first one and then another, around the ring. This operation is shown in FIG. 4, where the panels 20a are in a position where they have already been elevated to one higher level above the ground, panels 20b have been further elevated to a position accommodating more silage above the temporary level 28, the panel 20c is shown in course of its movement upward to the position of panels 20b, the action being much like that of raising a window sash. Each panel is provided with means engageable by an appropriate instrument, or even manually, to permit the vertical repositioning. Thus the illustrated panels are provided with a row of holes 30, along a central vertical line, any one of which can be engaged by an appropriate hook 31 which can be used by the operator standing on the ground or on the stack, to pull up the panel. Alternatively, simple jacking means or the like (not shown) can be employed. As indicated, the elevation of the panels, e.g. successively singly, or in small groups, is achieved from time to time as the stack rises, being preferably initiated each time when the general level of the stack is some or even a considerable distance below the top edge of the panel assembly.

In this fashion the wide cylindrical form is in effect re-established at successively higher levels while the compacted stack is being produced, the interlocking of the fibrous materials serving well to retain the cylindrical shape of the pile as at exposed, lower localities 32. When the stack, indicated at 33 in FIG. 5, has reached the desired height and is deemed completed, the form 20 can be disassembled and completely removed. To facilitate this operation with the structure at a substantially elevated locality (FIG. 5), temporary retaining means are provided so that the panels do not tumble rapidly to the ground, as soon as one of them is slid up and away. An example of such means comprises a sturdy stake 34 which is inserted into the top portion of the silage, at the center. The stake carries appropriate cable-retaining means, such as the ring structure 35 at the top of the stake. Hooked or mounted to the ring 35 are a multiplicity of ropes or wire cables 37, each with a hook 38 at its outer end that is engaged in one of the holes 30 of a panel. With the assembly temporarily tied in this manner the panels are successively pulled up and out, while the other panels are kept from falling to the ground by the cables. The entire assembly is thus removed and lowered to the ground, piece-by-piece, the panels being unhooked from the cables so as to be re-used in building another stack.

The tubular plastic cover 25 is then pulled up along the outer cylindrical wall of the stack 33, in the manner of a stocking, and its upper end portion is gathered across the top of the stack so as to be compressed and tied, as at 40, in the nature of a bag. Since a suitable end region or annulus of the plastic tube has remained tucked under the bottom of the stack, as diagrammatically indicated at 41 in FIG. 7, the result is a self-supporting mass of silage which is essentially completely enclosed by the plastic sleeve or film, except at the central area of the bottom where it rests firmly against the ground. In other words, there is a substantially true seal of the entire mass of silage from the air, and at the same time, the latter is piled in a substantially truly cylindrical shape, with a straight vertical side wall that provides economy of space and desirably close fit of the plastic film. The entire mass is effectively self-supporting, and the finished assembly (FIG. 7) constitutes an economical arrangement for storing silage, while the desired preservative fermentation occurs, and indeed thereafter for an indefinite period, even of many months, until the fodder is to be used. It will be understood, of course, that various additive or preservative materials may be incorporated as or after the stack is built (and before the plastic bag is pulled up and tied) such as molasses, preservative chemicals or the like, sometimes conventionally used in or with silage.

Figure 7:
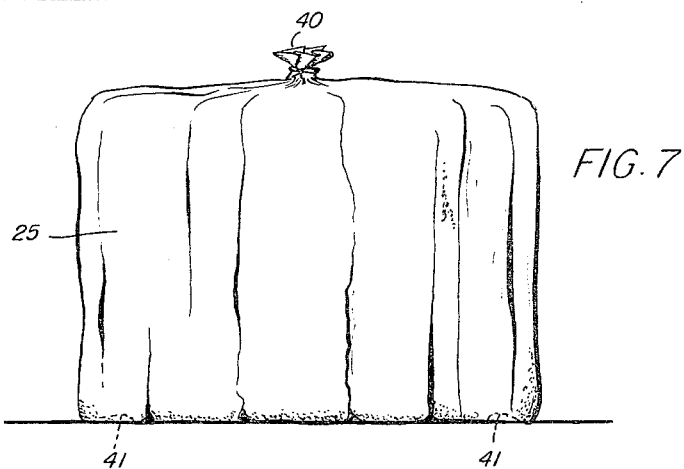
FIG. 7 is an elevational view of the completed, plastic-enclosed stack.

Practical tests have shown that when preserved in accordance with the present invention, i.e. in a sealed stack as illustrated in FIG. 7, the forage is effectively kept with essentially no surface spoilage and very little other loss. Specifically, it is found that no detectable spoilage occurs at the top or sides of the stack, and that only about 5% total dry matter losses occur as unavoidable because of fermentation or because of oxygen included in or with the plant material as stacked. Losses by evaporation are relatively very low, as likewise seepage. The fermentation thus effectively proceeds, generating certain gases which may indeed build sufficient pressure to cooperate in preventing any accidental inward leakage of air, the fermentation also, of course, serving to reduce the pH, e.g. to a value of about 4. As is understood, the reduction in pH is essentially caused by the formation of lactic acid by the organisms cooperating in the fermentation, e.g. lactobacilli. At the reduced pH, the aerobic or putrifying bacteria are killed or inhibited, while the fermentation is arrested, and the silage then remains in preserved condition, retaining its feed or nutrient values, for relatively long periods of time. Experience has shown that within a few days or less after the stack has been completed and the plastic enclosure sealed around it, generation of carbon dioxide and other gases expands the plastic bag, indeed in the nature of a balloon. In time, usually about a week or ten days, the carbon dioxide more or less escapes, in that the plastic is somewhat permeable to carbon dioxide although relatively impermeable to air, so that the plastic subsides into close-forming relation to the stack.

Although other plastic materials can be employed, preferably such as have suitable pliability, toughness and resistance to weather and permeation, particularly effective results have been obtained with polyvinyl chloride plastic, e.g. by making large sheets of the same into the desired tubular shape. One instance of suitable polyvinyl chloride formulation is the type known as KDA-2965 (Olive 21) (Bakelite Company), having a thickness of 0.008 inch. When the silage is to be used as fodder, the plastic cover is simply untied at the top and rolled down, and the preserved material is forked out in a conventional way, either by hand or with fork lift power equipment. Experience has shown that the plastic covers or bags can be re-used for subsequent stacks, e.g. as many as four or five or more times.

Figures 8, 15:
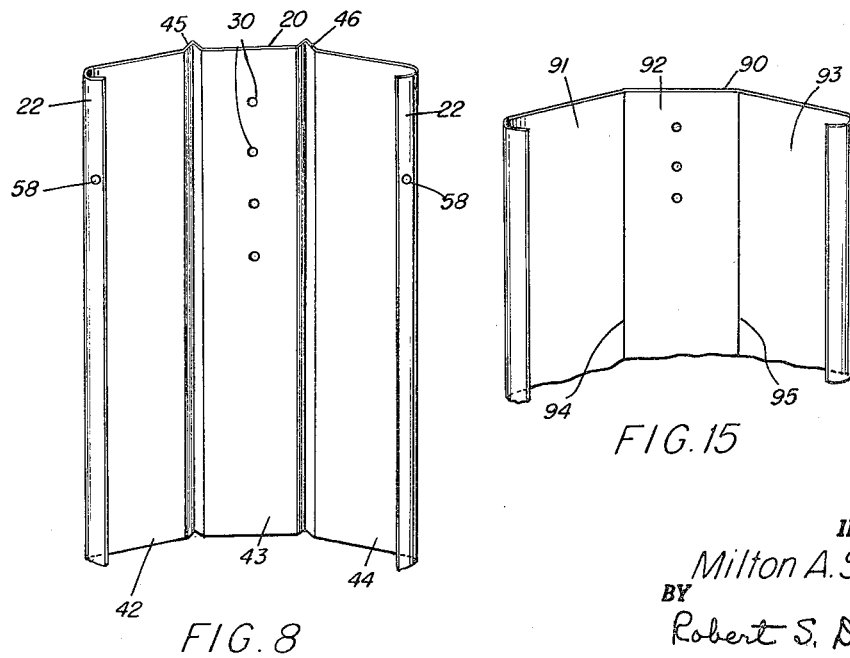
FIG. 8 is an enlarged perspective view on the interior side, of a single panel such as embodied in the structures of FIGS. 1 to 5.

Further important features of the improvements in stacking silage are related to the structure of the panels 20 that constitute the demountable form. Thus, as shown in FIG. 8, a presently preferred embodiment consists of the sheet metal panel 20, having the inwardly inturned or folded lips 22 at each side, and the engageable means for lifting the panel, embodied as the row of selectably usable holes 30. As shown, the panel is bent to conform approximately with the desired curvature of the ultimate form, specifically by providing three plane sections 42, 43 and 44 in succession crosswise of the panel. The other sections 42 and 44 thus extend at a small angle to the vertical palne in which the center section 43 lies.

A further feature of the panel 20 in FIG. 8 involves one or more ribs or corrugations, exemplified by the two V-shaped projections 45, 46 which are formed in the sheet metal at the intersections respectively of the portions 42 and 43 and the portions 43–44. Thus the projections 45, 46, which extend vertically from bottom to top of the panel, constitute grooves on the inner face of the latter, and ribs external thereto. A particular function of these elements is in guiding the panel when it is displaced vertically, i.e. moved upwardly, during the stacking operation. The packed forage tends to enter the grooves with some snugness, so as in effect to be molded in trackways upon which the panel then rides for upward displacement. Any tendency of a panel to sag or tilt sideways, and thus to cause binding of its interlock with the adjacent panel, is lessened.

Figure 10:
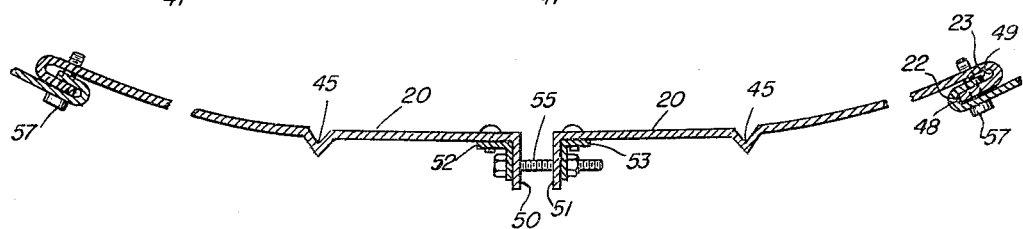
FIG. 10 is a fragmentary horizontal section on line 10—10 of FIG. 9.
Figure 11:
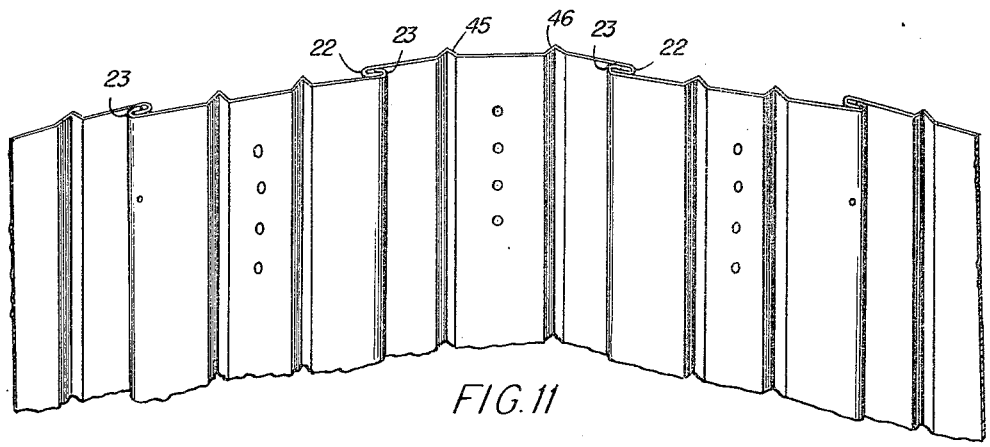
FIG. 11 is a fragmentary view of another part of a panel assembly such as shown in FIG. 9.
Figure 12:
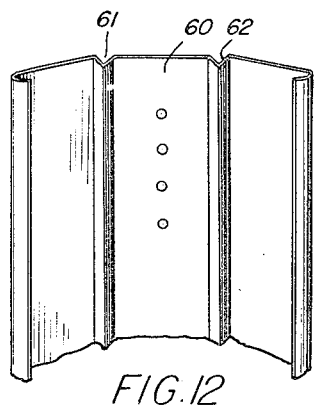
FIGS. 12, 13, 14 and 15 are respectively views of modified forms of panel, useful in structures of the sort shown in FIGS. 1 to 5.
Figure 9:
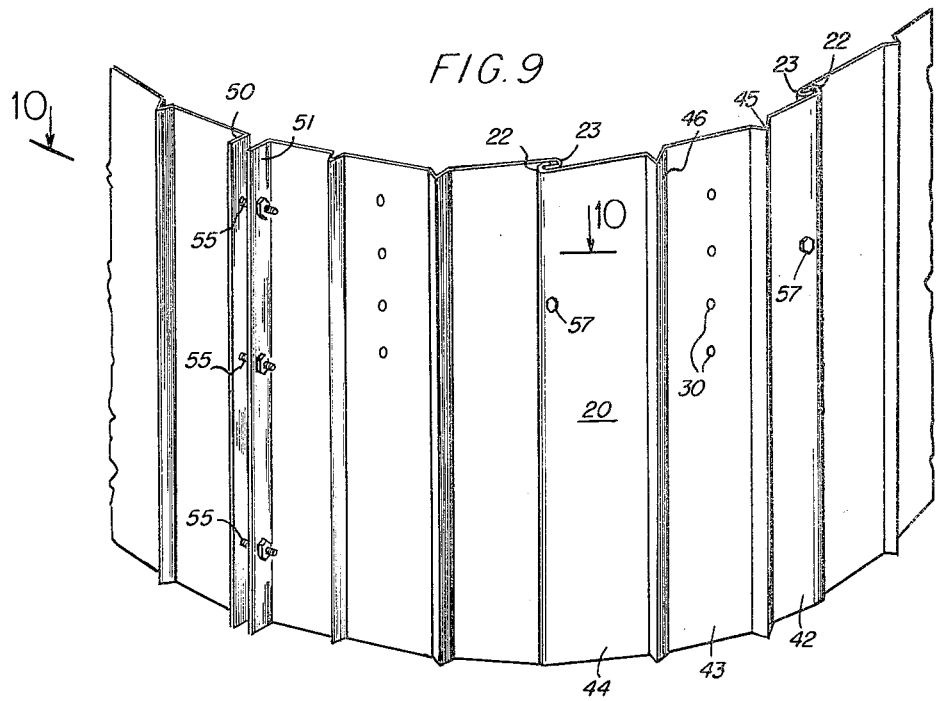
FIG. 9 is an enlarged perspective view, from the outside, of a certain portion of the panel assembly.

As shown in FIGS. 9, 10 and 11, the panels alternately have a pair of inwardly turned lips 22, 22, or a pair of outwardly turned lips 23, 23, although it will be understood that in some cases the lip at one side of each panel may be turned oppositely to that on the other side. A particular feature, however, is more clearly illustrated in FIGS. 10 and 11, in that at each juncture of mutually sliding interlock, one lip, such as lip 22 is narrower than the other lip, e.g. the lip 23 of the other panel. With this arrangement, as most clearly illustrated in FIG. 10, it is only the vertical edge of one lip that can engage the bottom or inner curve of the other lip. For instance, with the lip 23 wider, it may engage the inner corner or curve 48 of the lip 22, but the vertical edge of the narrower lip 22 remains entirely free or clear of the inside curve 49 of the lip 23. With this arrangement at each of the interfolded connections, and preferably with the aid of lubrication (such as graphite grease) at the connections, the upward, individual sliding of each panel is facilitated, in that friction with an adjacent panel (e.g. at the lubricated joint) is correspondingly reduced, i.e. occurring only at one rather than both lip edges.

Although it is possible to constitute the entire form with simple interlock of folded lips at every junction between the panels, it has been found desirable, both for ease in original assembly of the form and for some little adjustability of the form circumference (e.g. during use), to provide at least two of the panels with outwardly extending flanges such as shown at 50, 51 in FIGS. 9 and 10. The panels 20 carrying these flanges are arranged so that the latter are juxtaposed in near-abutting relation, the flanges extending from top to bottom of the panels along adjacent edges. As shown, the flanges may be reinforced by appropriate angle irons 52, 53, shown as riveted in place. These outwardly extending right-angle flanges are drilled at suitable localities so that they may be coupled with assemblies of bolts and nuts as shown at 55, three of such assemblies being illustrated in FIG. 9, spaced vertically.

With this last-described arrangement, the initial set-up of the form, to the desired diameter is facilitated. Furthermore as the form is lifted to successively higher levels, any looseness or tendency to slippage may be corrected by tightening the bolt assemblies 55, thus drawing the butt joint closer together. Alternatively, if excessive tightness develops, impeding the upward displacement of individual panels, the nuts of these assemblies can be backed off to the extent needed. As will be appreciated, the joint constituted by the flanges 50, 51 is originally established to have some separation, so as to accommodate tightening of the form when needed. In raising the form to successive heights, the specific panels 20 that carry the flanges 50, 51 are raised together; ordinarily the other panels will be most conveniently raised as single units in succession.

For initial sturdiness of the assembly, before any material has been stacked, a retaining pin (or series of retaining pins) may be passed through aligned registering holes at the edge regions of the panels, including the interleaved lips 22, 23. Thus as shown at both extremities of FIG. 10, a pin 57 is in each instance passed through aligned holes in one panel face, the engaged lips, and the other panel face, such holes being shown at 58, 58 in FIG. 8. When the form, while still at rest on the ground, has been partly filled so as to be held by pressure of the compacted plant material, the pins 57 are removed. The individual upward shifting of the panels may thereafter be accomplished, as already described.

Alternative panel configurations are shown in FIGS. 12 to 15 inclusive. Thus in FIG. 12, the panel 60 has a pair of inwardly projecting, V-shaped folds or corrugations 61, 62, extending vertically at spaced localities. These function similarly to the parts 45, 46 of FIG. 8, except that here the inward ribs cause the formation of corresponding grooves in the outer vertical surface of the stacked forage, along which the corrugations 61, 62 are guided when a panel is moved up.

Figure 13:
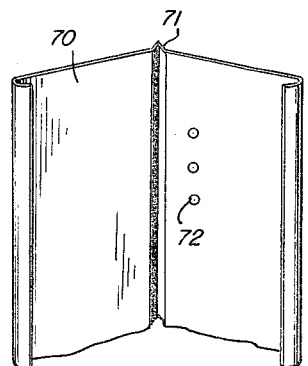
Figure 14:
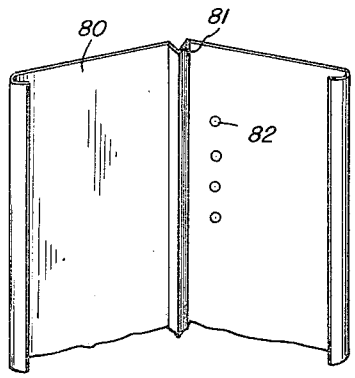

In FIG. 13 the panel 70 has only a single, outwardly projecting rib 71, formed (as before) by appropriate bending of the sheet metal. This in effect provides a single projecting track or rail extending vertically of the stacked silage, again for guiding the panel in a vertical direction. FIG. 14 shows a similar panel 80, wherein the rib 81 projects inwardly rather than outwardly, but accomplishes similar guiding function. If the single ribs 71, 81 are arranged centrally of the corresponding panels, along vertical lines, the structure for engaging the panel to move it up may constitute the row of holes 72 or 82, displaced somewhat laterally from the center line of the panel.

Finally, FIG. 15 shows a simpler form of panel 90, comprising the three upright sections 91, 92 and 93, like the sections 42 to 44 of FIG. 8, but without any guide ribs or corrugations, the outer portions 91, 93 being bent slightly relative to the central portion 90, i.e. along the bending lines 94, 95.

As explained, the panels may be individually proportioned and arranged so as to provide forms having a variety of diameters, e.g. from 10 to 20 feet or more. Each panel is preferably oblong in a vertical direction, i.e. has a substantially longer vertical than horizontal dimension. This relationship is specially desirable, in that better, nonbinding alignment of the panels is maintained and the substantial vertical height of the latter permits the fodder to be stacked to a correspondingly higher level, before the movement of the assembly (or before any subsequent movement) upward. By way of example, in one structure of the invention, the panels were designed for use of a group of twenty (20) of them to constitute a single cylinder having a diameter of 10 feet. Each panel 20 was a piece of galvanized sheeting measuring approximately 20 inches wide by 48 inches high. A 1 inch lip 22 or 23 (slightly differing on successive panels, as explained above) was folded back along each vertical edge of the panel, i.e. 180°, to constitute a long groove for receiving the similar lip of an adjacent panel. The side portions 42, 44 were bent at an angle of 18° relative to a projection of the plane of the central portion 43, past the oblique corner where the two panel portions meet. With this angular relationship at each vertical rib 45 or 46 of each panel, the assembled form approximately represented a circle, while avoiding sharper corners and correspondingly allowing considerable ease when each panel is lifted as the form is used. An appropriate design for a 20 foot diameter circle or cylinder involves 33 panels, having the bends at the ribs 45, 46 such as to make an angle of 11° (between each side portion and the extension of the plane of the center portion). The panels are again 4 feet high, and fashioned from sheets of about 2 feet in width, so that the actual span between the panel joints is about 21–22 inches. As will be readily appreciated, other numbers and dimensions of panels may be used, depending on the size of the stack desired and the requirement for employment of a multiplicity of individual panels which can be lifted with substantial ease. In general the panels should not be more than 3 feet wide and preferably not more than 30 inches wide. The height of the panels may vary, as from 3 to 6 feet, present preference being for panels 4 feet high.

It will now be appreciated that the arrangement affords a relatively simple stacking form, easily assembled or demounted, and of such character that it can be progressively elevated, i.e. to successively higher levels, as the stack builds up, by the simple manual expedient of lifting the panels individually in succession. The retaining interlock of successive panel lips keeps the assembly together, while permitting the desired, sliding upward movement of each panel. When the stack has been finished, the panels are removed, with the aid of the temporary retaining means 34, 35, 37 (FIG. 5) and the plastic fabric cover is brought up and secured in sealed condition. The plant material is thus kept fully enclosed, against access of air, while the fermenting action proceeds, with its preservative function. A exceptionally useful way is thus afforded, for building and retaining compact, straight-walled stacks of silage, and dispensing with the conventional tower silo or the like. Spoilage or other losses are minimal. The form structures may be repeatedly used over a long time, and are easily stored when desired. The successive upward steps of the panels may be of any extent, say 1 foot at a time, as may be found most effective in practice. It may also be noted that panels designed for a given base diameter, say 20 feet, may be employed in correspondingly greater or less number, to constitute forms of somewhat different diameter, e.g. in the range of 18 to 22 feet, thus providing convenient variation in volume or space, even as to a given set of panels. It will be understood that in general, the plastic tube or sleeve is kept in compacted or rolled condition, circularly surrounding the foot of the form and stack (FIG. 4), until the complete filling job is accomplished (with the panels hoisted in steps); thereupon the panels are removed and the sleeve is brought up and tied to enclose and seal the mass of forage (FIG. 7).

It is to be understood that the invention is not limited to the specific embodiments herein shown and described but may be carried out in other ways without departure from its spirit.

I claim:

1. Apparatus for stacking plant materials, comprising a multiplicity of vertically oblong, rectangular panels arranged in a substantially cylindrical interlocked array around a vertical axis, each panel having a reversely folded lip along each of its vertical edges, the folded lips of successive adjoining edges of the panels being mutually interlocked to hold the panels in the aforesaid cylindrical array, said folded lips being shaped to permit each panel to slide vertically relative to the two immediately adjoining panels with which it is interlocked, said cylindrical array of the panels being arranged to constitute a form in which the plant material can be packed tightly so as to provide a self-supporting stack upon removal of the cylindrical array of panels, said panels being adapted to be slid individually progressively upward for accommodating successive additional quantities of plant material in the stack, said panels being sufficient in number for a cylindrical form of desired diameter to enable individual panels to be of such size as to be readily slid upward by manual lifting force and each panel being shaped and proportioned for frictional retention of the panel in individually, partly elevated position relative to the two immediately adjoining panels by frictional engagement with packed material in the form.

2. Apparatus as defined in claim 1, which includes means adapted to be removably secured at a central locality in the top portion of a stack of plant material which portion will be built within said array of panels with the bottom edge of said array of panels being elevated with respect to the bottom of said stack, and a multiplicity of cords arranged to be secured to said last-mentioned means and respectively to each of the panels, for holding the individual panels temporarily while the array of panels is being disassembled upon the completion of the stack.

3. Apparatus as defined in claim 1 wherein each panel has at least one vertical corrugation intermediate and parallel to its side edges, for guiding said panel, in engagement with plant material compressed inside the enclosure, when said panel is slid to a higher level.

4. Apparatus as defined in claim 1 wherein each panel has a reversely folded lip along each of its vertical edges, the folded lips of successive adjoining edges being mutually interlocked so that individual panels can be slid upwardly relative to the two immediately adjoining panels, one of the lips in each interlocked pair being wider than the other so that only said wider lip can have its vertical edge in contact with an inner curve of a lip fold in said pair.

5. Apparatus as defined in claim 1, wherein the panels of one adjacent pair of same have juxtaposed angular flanges along their adjoining edges, and wherein the apparatus includes adjustable fastening means connecting the flanges, so that the enclosure-forming array of panels can be tightened or loosened by adjustment of said last-mentioned means.

6. Apparatus for stacking plant materials, comprising a multiplicity of rectangular panels arranged in a substantially cylindrical interlocked array around a vertical axis, each panel having a reversely folded lip along each of its vertical edges, the folded lips of successive adjoining edges of the panels being mutually interlocked to hold the panels in the aforesaid cylindrical array, said folded lips being shaped to permit each panel to slide vertically relative to the two immediately adjoining panels with which it is interlocked, said cylindrical array of the panels being arranged to constitute a form in which the plant material can be packed tightly so as to provide a self-supporting stack upon removal of the cylindrical array of panels, said panels being adapted to be slid individually progressively upward for accommodating successive additional quantities of plant material in the stack, each panel having at least one vertical corrugation engageable by compacted plant material within the form to provide with said material a trackway for guiding said panel vertically on movement upward, said panels being sufficient in number for a cylindrical form of desired diameter to enable individual panels to be of such size as to be readily slid upward by manual lifting force and each panel being shaped and proportioned for frictional retention of the panel in individually, partly elevated position relative to the two immediately adjoining panels by frictional engagement with packed material in the form, and each of the panels having engageable means at an upper portion thereof, adapted to be engaged by insertion of a member for manual upward individual sliding of the panel.

7. Apparatus for stacking plant materials, comprising a multiplicity of rectangular panels arranged in a substantially cylindrical interlocked array around a vertical axis, each panel having a reversely folded lip along each of its vertical edges, the folded lips of successive adjoining edges of the panels being mutually interlocked to hold the panels in the aforesaid cylindrical array, said folded lips, as so disposed in interlocked pairs, being shaped to permit each panel to slide vertically relative to the two immediately adjoining panels with which it is interlocked, one of the lips in each interlocked pair being wider than the other so that only said wider lip has its vertical edge in contact with an inner curve of a lip fold in said pair, said cylindrical array of the panels being arranged to constitute a form in which the plant material can be packed tightly so as to provide a self-supporting stack upon removal of the panels, said panels being adapted to be slid individually progressively upward for accommodating successive additional quantities of plant material in the stack, said panels being sufficient in number for a cylindrical form of desired diameter to enable individual panels to be of such size as to be readily slid upward by direct manual lifting force and each panel being shaped and proportioned for frictional retention of the panel in individually, partly elevated position relative to the two immediately adjoining panels by frictional engagement with packed material in the form, wherein each panel has at least one vertical corrugation intermediate and parallel to its side edges, for guiding the panel, in engagement with plant material compressed inside the cylindrical array, when the panel is slid to a higher level, and each of the panels having engageable means at an upper portion thereof, adapted to be engaged by insertion of a member for manual upward individual sliding of the panel.

References Cited by the Examiner

UNITED STATES PATENTS

| 206,797 | 8/78 | Kamp et al. | 99—2 |
| 2,740,350 | 4/56 | Frigieri et al. | 214—9 X |
| 2,768,896 | 10/56 | Lewis | 99—2 |
| 2,917,138 | 12/59 | Walsh | 189—3 |
| 2,930,458 | 3/60 | Siebring | 189—3 |

FOREIGN PATENTS 745,215  2/56  Great Britain.

RICHARD W. COOKE, Jr., *Primary Examiner.*

ABRAHAM H. WINKELSTEIN, *Examiner.*